US007785193B2

(12) United States Patent
Paulsen et al.

(10) Patent No.: US 7,785,193 B2
(45) Date of Patent: Aug. 31, 2010

(54) CASHLESS BONUSING FOR GAMING MACHINES

(75) Inventors: Craig A. Paulsen, Reno, NV (US); Binh T. Nguyen, Reno, NV (US)

(73) Assignee: IGT, Reno, NV (US)

( * ) Notice: Subject to any disclaimer, the term of this patent is extended or adjusted under 35 U.S.C. 154(b) by 746 days.

(21) Appl. No.: 10/114,006

(22) Filed: Mar. 29, 2002

(65) Prior Publication Data

US 2003/0186739 A1 Oct. 2, 2003

(51) Int. Cl.
*A63F 13/00* (2006.01)

(52) U.S. Cl. ........................................................ 463/25

(58) Field of Classification Search ............. 463/16–42; 273/138.1, 138 A, 138 R, 143 A, 139, 269; 235/379–381

See application file for complete search history.

(56) References Cited

U.S. PATENT DOCUMENTS 4,880,237 A * 11/1989 Kishishita .................... 463/25
4,953,895 A * 9/1990 Goussios .................... 283/102
4,962,950 A * 10/1990 Champion ................... 283/67
5,025,139 A * 6/1991 Halliburton, Jr. ............ 235/379
5,038,022 A 8/1991 Lucero
5,119,295 A 6/1992 Kapur
5,129,652 A 7/1992 Wilkinson
5,265,874 A 11/1993 Dickinson et al.
5,290,033 A * 3/1994 Bittner et al. ................. 463/25
5,292,127 A 3/1994 Kelly et al.
5,429,361 A 7/1995 Raven et al.
5,557,086 A 9/1996 Schulze et al.
5,618,045 A 4/1997 Kagan et al.
5,643,086 A 7/1997 Alcorn et al.
5,678,886 A 10/1997 Infanti
5,707,285 A 1/1998 Place et al.
5,741,183 A 4/1998 Acres et al.
5,761,647 A 6/1998 Boushy
5,768,382 A 6/1998 Schneier et al.
5,770,533 A 6/1998 Franchi
5,779,545 A 7/1998 Berg et al.
5,785,315 A * 7/1998 Eiteneer et al. ............. 273/139
5,795,228 A 8/1998 Trumbull et al.

(Continued)

FOREIGN PATENT DOCUMENTS

DE 3441518 A1 5/1986

(Continued)

OTHER PUBLICATIONS

"Heavy Duty Dollar Bill Size Direct Thermal Slot Machine Voucher: Operators Manual", Future Logic, Incorporated, 2000.

(Continued)

*Primary Examiner*—Scott Jones
(74) *Attorney, Agent, or Firm*—Weaver Austin Villeneuve & Sampson LLP

(57) ABSTRACT

A cashless technology involves issuance of bonus awards to players. The bonus awards themselves are cash, service, merchandise, etc. But the game issues these awards in the form of a cashless instrument representing the award. The cashless instrument may be issued under various circumstances and in various forms such as pre-printed tickets, peelable tickets, updated information on a player card, updated information in a database, etc.

34 Claims, 7 Drawing Sheets

U.S. PATENT DOCUMENTS

| | | | | |
|---|---|---|---|---|
| 5,797,085 | A | 8/1998 | Beuk et al. | |
| 5,816,918 | A | 10/1998 | Kelly et al. | |
| 5,865,470 | A * | 2/1999 | Thompson | 283/70 |
| 5,871,398 | A | 2/1999 | Schneier et al. | |
| 5,876,284 | A | 3/1999 | Acres et al. | |
| 5,916,024 | A * | 6/1999 | Von Kohorn | 463/40 |
| 5,928,082 | A * | 7/1999 | Clapper, Jr. | 463/16 |
| 5,931,467 | A * | 8/1999 | Kamille | 273/139 |
| 5,971,195 | A * | 10/1999 | Reidinger et al. | 220/521 |
| 5,971,271 | A | 10/1999 | Wynn et al. | |
| 5,999,808 | A | 12/1999 | LaDue | |
| 6,007,426 | A | 12/1999 | Kelly et al. | |
| 6,012,832 | A | 1/2000 | Saunders et al. | |
| 6,012,983 | A | 1/2000 | Walker et al. | |
| 6,015,344 | A | 1/2000 | Kelly et al. | |
| 6,019,283 | A | 2/2000 | Lucero | |
| 6,048,269 | A | 4/2000 | Burns et al. | |
| 6,056,289 | A * | 5/2000 | Clapper, Jr. | 273/138.2 |
| 6,093,100 | A | 7/2000 | Singer et al. | |
| 6,104,815 | A | 8/2000 | Alcorn et al. | |
| 6,106,396 | A | 8/2000 | Alcorn et al. | |
| 6,113,098 | A * | 9/2000 | Adams | 273/143 R |
| 6,135,884 | A | 10/2000 | Griswold et al. | |
| 6,139,430 | A * | 10/2000 | Huard et al. | 463/16 |
| 6,146,273 | A | 11/2000 | Olsen | |
| 6,149,522 | A | 11/2000 | Alcorn et al. | |
| 6,162,122 | A | 12/2000 | Acres et al. | |
| 6,217,448 | B1 | 4/2001 | Olsen | |
| 6,220,961 | B1 * | 4/2001 | Keane et al. | 463/16 |
| 6,231,445 | B1 | 5/2001 | Acres | |
| 6,234,477 | B1 * | 5/2001 | Scrymgeour et al. | 273/139 |
| 6,244,958 | B1 | 6/2001 | Acres | |
| 6,254,483 | B1 | 7/2001 | Acres | |
| 6,270,410 | B1 | 8/2001 | DeMar et al. | |
| 6,280,326 | B1 * | 8/2001 | Saunders | 463/25 |
| 6,285,868 | B1 | 9/2001 | LaDue | |
| 6,315,666 | B1 | 11/2001 | Mastera et al. | |
| 6,364,768 | B1 * | 4/2002 | Acres et al. | 463/25 |
| 6,424,949 | B1 | 7/2002 | Deaton et al. | |
| 6,623,357 | B2 * | 9/2003 | Chowdhury | 463/25 |
| 6,636,892 | B1 | 10/2003 | Philyaw | |
| 6,758,757 | B2 * | 7/2004 | Luciano et al. | 463/43 |
| 6,832,956 | B1 | 12/2004 | Boyd et al. | |
| 7,125,017 | B2 * | 10/2006 | LaPorte et al. | 273/269 |
| 2001/0034259 | A1 | 10/2001 | Luciano et al. | |
| 2001/0036855 | A1 * | 11/2001 | DeFrees-Parrott et al. | 463/17 |
| 2002/0002075 | A1 * | 1/2002 | Rowe | 463/25 |
| 2002/0077174 | A1 * | 6/2002 | Luciano et al. | 463/25 |
| 2002/0077175 | A1 * | 6/2002 | Jorasch et al. | 463/25 |
| 2002/0177479 | A1 * | 11/2002 | Walker et al. | 463/25 |
| 2003/0186739 | A1 * | 10/2003 | Paulsen et al. | 463/25 |

FOREIGN PATENT DOCUMENTS

| | | | |
|---|---|---|---|
| DE | 19502613 | A1 | 1/1995 |
| DE | 4422370 | A1 | 1/1996 |
| EP | 0805424 | A2 | 11/1997 |
| WO | WO 95/24689 | | 9/1995 |
| WO | WO 96/00950 | | 1/1996 |
| WO | WO01/76710 | A2 | 10/2001 |
| WO | WO01/84516 | A2 | 11/2001 |

OTHER PUBLICATIONS

Rowe et al., "Wireless Gaming Environment", U.S. Appl. No. 09/544,884, filed Apr. 7, 2000, 34 Pages.
Richard E. Rowe, "Cashless Transaction Clearinghouse", U.S. Appl. No. 09/648,382, filed Aug. 25, 2000, 40 Pages.
Saffari et al., "Thermal Printer with Dual Head-Audit Trail", U.S. Appl. No. 09/795,337, filed Feb. 27, 2001, 38 Pages.
Hedrick et al., "Gaming Machine Having Secondary Display for Providing Video Content," U.S. Appl. No. 09/615,968, filed Jul. 14, 2000, 42 Pages.
Brochure describing "Diamonds" bonus game-available prior to filing date in 2001.
"Where's the Smart Money," Science Technology, Feb. 7, 2002, Printed from website, www.economist.com, on Mar. 11, 2002, 2 Pages.
Australian Examination Report dated May 20, 2008, for related Australian Patent Application No. 2003201009.

* cited by examiner

FIG. 5B
RED STAR CASINO
INTERNET GAMING RECEIPT
PLAYABLE AT THE RED STAR CASINO IN
LAS VEGAS, NEVADA
511
519
RECEIPT AMOUNT: $254.87
519"
513
519'
PLAYER NAME:
MIKE SMITH
PLAYER
NUMBER: 75169
515
GAMING RECEIPT
SERIAL NUMBER:
5628460
517
523
525
521
Mike Smith
PLAYER SIGNATURE
PLAYER PHOTO
PLAYER FINGERPRINT
527
PROMOTIONAL BANNER ADVERTISEMENT AREA
GAMBLING.COM GO
Click Here
The Ultimate
Gambling Directory
Red or
Black?
PLAY!
WIN PRIZES!
F GAMBLING.COM GO S!
Please make your selection
from the following options:
FREE Casino Games
OK
Cancel

CASHLESS BONUSING FOR GAMING MACHINES

BACKGROUND

The present invention relates to awards issued by gaming machines such as slot machines and video poker machines. More particularly, this invention relates to cashless bonus awards issued by gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented or replaced by ticket dispensers which print ticket vouchers that may be exchanged for cash or accepted indicia of credit in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ Pay™ ticket system by International Game Technology of Reno, Nev. Award ticket systems and systems using other cashless mediums are referred to as cashless systems.

Cashless systems, such as the EZ Pay™ ticket system, provide advantages to both game players and casino operators. For example, many players find it more convenient to carry an award ticket than a large number of coins. For gaming machine operators, cashless systems tend to reduce gaming machine operating costs. For example, the infrastructure needed to remove and count indicia of credit (e.g. coins, tokens, bills) from the gaming machine may be minimized when it is replaced with a cashless system, which reduces the gaming machine operating costs and machine down-time. Further, coin dust, which is potentially damaging to the components of the gaming machine (e.g. electronic components) may be eliminated or minimized when the cashless system is added to or replace the coin acceptor.

Currently, cashless systems have become very popular and have been embraced by customers. For example, ticket vouchers that are generated upon cashout and redeemed for cash or gaming machine credits within a particular casino are well accepted by game players. When a ticket voucher is generated in a gaming machine, the ticket voucher is typically printed on a media of some type such as paper. Various voucher parameters including a voucher value, an issue time, a place of issue, an identification number, graphics, etc., may be printed on the paper ticket. In addition, the voucher parameters may be stored electronically at some location for verification and auditing purposes. Once the ticket voucher is printed, a customer may remove the ticket and may utilize it for additional game play or may redeem it for cash.

While cashless systems such as EZ Pay™ represent a significant advance in the art, cashless games and applications are still in their infancy, in some regards. Therefore, other cashless applications remain to be developed and implemented.

SUMMARY OF THE DISCLOSURE

The present invention provides a cashless technology in which bonus awards are issued to players. The bonus awards themselves are cash, service, merchandise, etc. But the game issues these awards in the form of a cashless instrument representing the award. The cashless instrument may be issued under various circumstances and in various forms. These are the subject of this invention.

One aspect of the invention provides a method of providing a primary game (e.g., slots, video card games, keno, pachinko, checkers, etc.) together with a bonus game on a gaming machine. The method may be characterized by the following sequence: (a) executing at least part of a play of the primary game on the gaming machine; (b) determining that a bonus award should be issued; and (c) issuing a cashless indicator of the bonus award from the gaming machine.

Examples of cashless indicators include tickets, information written to a portable instrument identifying a particular player (e.g., a player tracking card or a smart card), and information written to a data repository and specifying the bonus award for a particular player. In some cases, the cashless indicator includes at least two portions, which are separable from one another. At least one of these two portions is redeemable for the bonus award. The two portions are adhesively affixed to one another and can be separated by peeling one portion off of the other portion. Or they are attached by perforation, etc.

For some embodiments, data representing the bonus award is transferred by a wireless technology. Examples include infrared signals and radio frequency signals (using, e.g., the BlueTooth protocol), and cellular signals. The transfer will take place from a "game" (e.g., the gaming machine to a portable instrument such as a PDA, smart card, cellular telephone, etc.

Issuance of the cashless indicator may be triggering by various events. Issuance may or may not be associated with the primary game played on the machine. In one example, the machine issues cashless indicators of a primary game awards, as well as indicators of the bonus awards. And issuing the cashless indicator of the bonus award can involve issuing an instrument having a representation of the bonus award together with a representation of the primary award. For example, the instrument can be a ticket having the representation of the bonus award on one side and the representation of the primary award on the other side.

Another variation of the invention involves issuance of cashless indicators of the bonus award that include indicia for playing a "secondary" bonus game. In some embodiments, the secondary bonus game is more than simply a bonus award during play on the gaming machine. It involves a further game beyond the primary game and the bonus game. That additional game may allow further awards beyond the one already issued for the bonus game. Or it may involve a hurdle to receiving the base bonus award for the bonus game. In one example, the secondary bonus game involves collecting multiple different cashless indicators of the bonus award. In another example, the secondary bonus game involves a scratch-off or peel-off game (e.g., a lottery game) printed on the cashless indicator of the bonus award.

The cashless indicators are redeemed for their corresponding bonus award. Redemption may take place at a game machine, a kiosk, over the Internet, at a validation terminal, or other convenient site. The redemption will involve a human or a machine. Machine mechanisms include bill scanners, infrared sensors, card readers, BlueTooth transceivers, etc.

Another aspect of the invention also involves a method of providing a bonus game and a primary game on a gaming machine. But the method is characterized by a slightly different sequence: (a) executing a play of the primary game on the gaming machine; (b) issuing a primary award for a winning outcome of the play of the primary game; and (c) issuing a cashless indicator of a bonus award with the primary award. In this approach, the cashless indicator of the bonus award is issued with the primary award. So the method is particularly well suited for cashless primary games, such as games where tickets from primary game awards have, at times, bonus game awards as well. For this method, the cashless indicator may take any of the forms outlined above. It may also provide for playing a secondary bonus game as outlined above.

Another aspect of the invention provides a gaming machine for playing a primary game and a bonus game. The gaming machine may be characterized by the following components: (a) a dispenser for issuing cashless indicia of game awards; (b) primary game logic for determining an outcome of the primary game and for presenting a presentation of the primary game; and (c) bonus game logic for instructing the dispenser to issue the cashless indicia of awards in response to a determination that a bonus event has occurred. In many embodiments, the gaming machine may also include an interface for communicating with a server that provides information about the bonus game.

While many different types of dispenser may be used, one preferred dispenser for printing tickets is a thermal printer. For network gaming, the dispenser could be any printer accessible to a client computer (e.g., a player's home inkjet or laser printer). The printer can be configured or specially designed to print indicia of the bonus award on a first side of a ticket opposite a second side having additional information. The second side may display at least one of a primary game award and promotional information.

Some conventional examples of primary game logic include logic for playing one or more of a slot game, a video card game, a keno game, a pachinko game, and a checkers game. The bonus game logic can take many different forms. In one case, it is coupled to the primary game logic in a manner allowing the bonus game logic to detect events in the primary game that trigger issuance of the cashless indicia of bonus awards. Alternatively, the bonus game logic randomly issues the cashless indicia of bonus awards.

The invention also pertains to systems comprising one or more gaming machines as described above together with a server for communicating over a network with the gaming machine and serving data pertaining to the bonus game.

These and other features and advantages of the present invention will be described below with reference to the associated drawings.

DETAILED DESCRIPTION

Introduction

Figure 1:
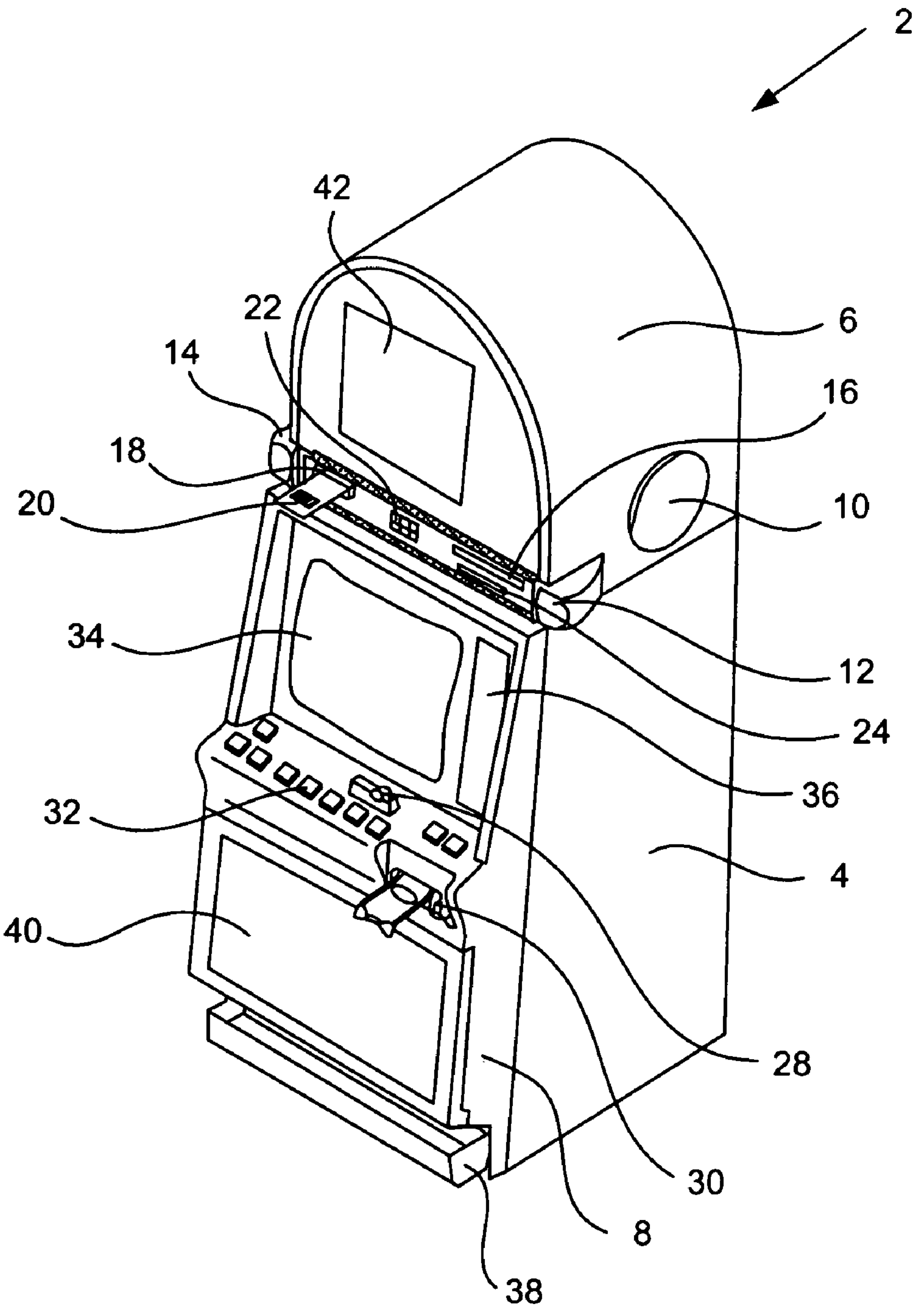
FIG. 1 is a perspective drawing of a gaming machine having a top box and other devices.

This invention pertains to technology for issuing bonus awards for or during play of a gaming machine. The bonus awards are issued via cashless instruments (sometimes referred to as "cashless indicators" or "cashless indicia" herein). These may be redeemed for various bonus awards such as services, merchandise, comps, additional game plays, etc.

The bonus award is issued as part of a "bonus game." The concept of the bonus game is rather expansive. It sometimes involves an elaborate secondary game presented on a gaming machine. Other times it involves a simple random or semi-random issuance of bonus awards not directly connected to a primary game on the machine. In most instances, it supplements a "primary game" played on a gaming machine. The primary game is typically a slot game, video poker, keno, checkers, pachinko, or other game provided on the gaming machine.

The primary game has its own awards for winning outcomes. The bonus awards of this invention (as provided via the cashless instruments) supplement the "primary awards" issued for normal play of the primary game. Appropriate game logic determines when a bonus award should be issued. Typically, this is triggered when a predetermined or random event (a "bonus event") occurs. At that point, the game logic instructs the machine to issue a cashless indicator of the bonus award. The bonus event may be tied directly to some event in the primary game (e.g., a coin in or coin out event). It may also be tied to the quantity of play on the primary game. For example, after a certain length of playing time or a certain number of primary game awards, the probability of the bonus award increases—or the award becomes certain.

The primary game is typically "executed" on the gaming machine during normal play. The execution may be triggered mechanically (e.g., the pulling of a lever actuates mechanically driven slot reels), electrically, or by a combination of the two. Typically, game execution is divided into at least two stages or components: game outcome determination (lose, win $A, win $B, . . . ) and game presentation. In modern gaming machines, game outcome determination typically employs an algorithm acting on or with a random number generator and a paytable. It occurs transparently. In other words, the player does not see it happening. Presentation involves displaying a video sequence or a mechanical sequence or both. At the end of the game presentation, the game outcome is depicted to the player. During a slot game play sequence, for example, game logic first determines whether the player will lose or win and, if she wins, how much she wins. This is the game outcome determination. Next the gaming machine displays spinning reels during the game presentation phase. Finally, the game logic directs the reels to settle at positions corresponding to the game outcome originally calculated. If a winning event resulted, the machine will issue a primary award as either cash or a cashless indicator of the primary award.

The issuance of a cashless instrument representing the bonus award may occur at any time during play of the primary game. In one embodiment described herein, the cashless instrument issues concurrently with the primary award, sometimes as part of the same ticket or other cashless indicator. In certain other embodiments, the cashless instrument is issued entirely separate from the primary award. The separation may be in time, place, and format. Hence the primary award might be a cash award dropped from a coin hopper, while the bonus award might occur via a cashless ticket issued from a separate dispenser on the machine (or even on a separate machine) before or during game presentation. Other permutations are possible.

Note that the concept of a gaming machine extends to home computers connected over a network (often the Internet) to game servers that provide the necessary game logic to control interaction with a remote game player. The remote game player uses his/her client computer to receive network data from the game server. The game server determines the game outcome and directs the game presentation displayed on the client computer. As part of the network game, a cashless indicia of bonus awards are generated at the client computer. These may be printed from a local computer onto 8½×11 inch paper or another printable medium.

As explained in more detail below, the cashless indicia of the bonus award may take many different forms. General examples include tokens, printed tickets, or coupons dispensed by machines, information written to a smart card, player tracking card, or other instrument controlled by the player (at least temporarily), and information written to a database or other repository of data pertaining to player.

In the case of redeemable instruments issued by gaming machines (or other apparatus associated with the game machine), the instrument may serve functions in addition to merely providing indicia of the bonus award. It may also include indicia of the primary game award, advertising, or other information. Both the indicia of the primary award and the indicia of the bonus award may be preprinted on blank instruments in the machine or one or both may be printed at issuance. In one embodiment, the indicia of the bonus award is preprinted on a portion of only certain instruments held in the machine prior to issuance. When a winning event occurs during the primary game, a new cashless instrument is printed to show the primary game award. If the instrument printed has, by chance, a bonus award preprinted thereon, the player wins both a primary game award and a bonus award, as indicated on the dispensed instrument. In one specific case, the bonus game award is indicated on one side of the instrument and the primary game award (or other information) is printed on the other side.

In another embodiment, the printed instruments are issued as duplicates, one showing a bonus award and the other showing other information such as a primary game award. Alternatively, a single instrument is issued, but that instrument has two portions that can be separated. One portion may be affixed to the other by perforations, adhesion, etc. In a specific embodiment, the two portions can be peeled apart from one another.

In still other embodiments, the bonus award instrument can be used to play a "secondary bonus game" such as a bingo game, a scratch away lottery type game, etc. Or the cashless indicators of the bonus game may have different formats (e.g., colors) and multiple of these formats must be collected by a player in order to "win" the secondary bonus game.

Gaming Machines and Ticket Dispensing Apparatus

The machines described herein dispense or otherwise issue cashless indicia of a bonus award. They may accomplish this in a variety of ways. And, they may include many different combinations of award dispensers, play interfaces, bill validators, cashless indicia validators, etc.

The machine may have a single dispenser for awards from both the primary game and bonus game. Alternatively, the machine may include two or more award dispensers. In some embodiments, both of these dispensers can dispense cashless indicia. One of them is dedicated to issuing bonus awards and the other to issuing primary game awards. In other embodiments, one dispenser can be a cash dispenser and the other a cashless dispenser. The bonus awards are issued come from the cashless dispenser. The machine may also have a receptacle for accepting non-cash indicia such as the cashless instruments issued in accordance with this invention. Such receptacles allow the machine to credit players based on previously issued bonus awards or previously issued primary game awards.

The gaming machine may be a stand-alone machine or it may be connected to a server or other computational machine. It may also be connected to other gaming machines via a network. The network may allow communication by any of a number of suitable protocols, standard, proprietary, etc. If the machine is connected to a server, that server may (or may not) communicate information associated with the bonus awards. Such information includes directions to award bonuses, directions to return player information to update databases of bonus awards in the server, etc. One example of a cashless network system will be described below. In some embodiments, the gaming machine itself does not control the game outcome and/or the game presentation. The gaming machine, in such cases, is merely a terminal, a client computer, etc. And another machine contains the game logic for providing the outcome and/or presentation.

Generally, a master gaming controller (described below) and associated software or other logic instructions provide "primary game logic" and "bonus game logic." The primary game logic is responsible for determining a game outcome and instructing the gaming machine to give a game presentation consistent with that outcome. The bonus game logic is responsible for determining the bonus game outcome in response to one or more user inputs. In simple embodiments, this involves nothing more than a determination that a bonus award should be given randomly and then instructing the printer or other mechanism to issue the cashless indicia of the bonus award. In other embodiments, the bonus game logic instructs the gaming machine to give a sophisticated bonus game presentation. In some embodiments, the bonus game logic is coupled to the primary game logic in a manner allowing the bonus game logic to detect events in the primary game that trigger issuance of the cashless indicia of bonus awards.

A sample gaming machine suitable for use with this invention is depicted in FIG. 1. As shown, a video gaming machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the maximum coin value. The bill validator 30, player-input switches 32, video display monitor 34, and information panel are devices used to play a game on the game machine 2. The devices are controlled by circuitry (see FIG. 2) housed inside the main cabinet 4 of the machine 2. Many possible games, including traditional slot games, video slot games, video poker, video lottery, video blackjack, video pachinko, video keno, general video card games and video games of chance may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18, such as a thermal printer, which may print bar-coded tickets 20, a key pad 22 for entering player tracking information, a vacuum florescent display 16 for displaying player tracking information, a card reader 24 for entering a magnetic striped card containing player tracking information. Further, the top box 6 may house different or additional devices than those shown in FIG. 1. For example, the top box may contain a bonus wheel or a back-lit silk screened panel which may be used to add bonus features to the game being played on the gaming machine. During a game, these devices are controlled and powered, in part, by circuitry (see FIG. 2) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar counters and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Further, a game may be generated in a host computer and displayed on a remote terminal or a remote gaming device. The remote gaming device may be connected to the host computer via a network of some type such as a local area network, a wide area network, an intranet or the Internet. The remote gaming device may be a portable gaming device such as a cell phone, a personal digital assistant, and a wireless game player. Those of skill in the art will understand that the present invention, as described below, can be deployed on most any gaming machine now available or hereafter developed.

Returning to the example of FIG. 1, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including ticket 20, as an indicator of credit. As another example, the card reader 24 may accept a debit card or a smart card containing cash or credit information that may be used to register credits on the gaming machine. In yet another example, an electronic fund transfer may be used to register credits on the gaming machine.

Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 2 is located or the ticket voucher may have been generated at another property for example a second casino. Details of the components of a cashless system and validation methods used in a preferred embodiment of a cashless system are described with reference to FIG. 3.

The dispenser of the cashless indicia of bonus awards can take many forms. To employ printed ticket vouchers in a cashless system, the physical ticket must satisfy a number of requirements. For example, like paper currency, the media of the ticket and the graphics on the ticket must be durable because a player may carry a printed ticket voucher for an extended period of time (e.g. months). While carrying the ticket, the player may repeatedly handle it in a manner that causes the ticket to degrade such as folding it or bending it. As damage accumulates to the ticket, it may eventually become unusable. Hence, the need for durability. Another requirement of printed ticket vouchers used in cashless systems is fast printing of high quality graphics. A quick print time is desirable because the player does not want to wait a long time to receive a printed ticket voucher. The high quality graphics are necessary for using the printed tickets in a ticket reader such as a bill validator. Yet another requirement of printed ticket vouchers is a very reliable and simple to operate printing mechanism to minimize maintenance and operation costs.

A thermal printer is a widely used mechanism for printing ticket vouchers as part of a cashless system that meets the requirements described above. A thermal printer uses a heated plate to thermally activate ink imbedded in a durable paper-like media. The thermal printer can quickly print high quality graphics that may be read by a ticket reader such as a bill validator. In addition, thermal printers tend to be reliable and easy to maintain.

One suitable printer for printing bonus award tickets in accordance with this invention is described in U.S. patent application Ser. No. 09/795,337, filed Feb. 27, 2001, by Saffari et al. That patent application is incorporated herein by reference in its entirety and for all purposes. For remote players (e.g., Internet gaming players), the printer can be a suitable home printer such as an inkjet printer or a laser printer.

For cashless bonus awards that are applied to portable instruments such as smart cards, personal digital assistants, and cellular telephones, the gaming machine may transfer data by a wireless medium. In such cases, the gaming machine will include an appropriate wireless signal transceiver and associated logic. For example, the gaming machine may include a mechanism for sending a cellular message a player's cellular receiver (e.g., a telephone), or a mechanism for sending and receiving infrared signals, or a mechanism for sending and receiving radio frequency signals. In each case, an appropriate data transfer protocol will be employed. The protocol may be proprietary or non-proprietary (e.g., BlueTooth).

Figure 2:
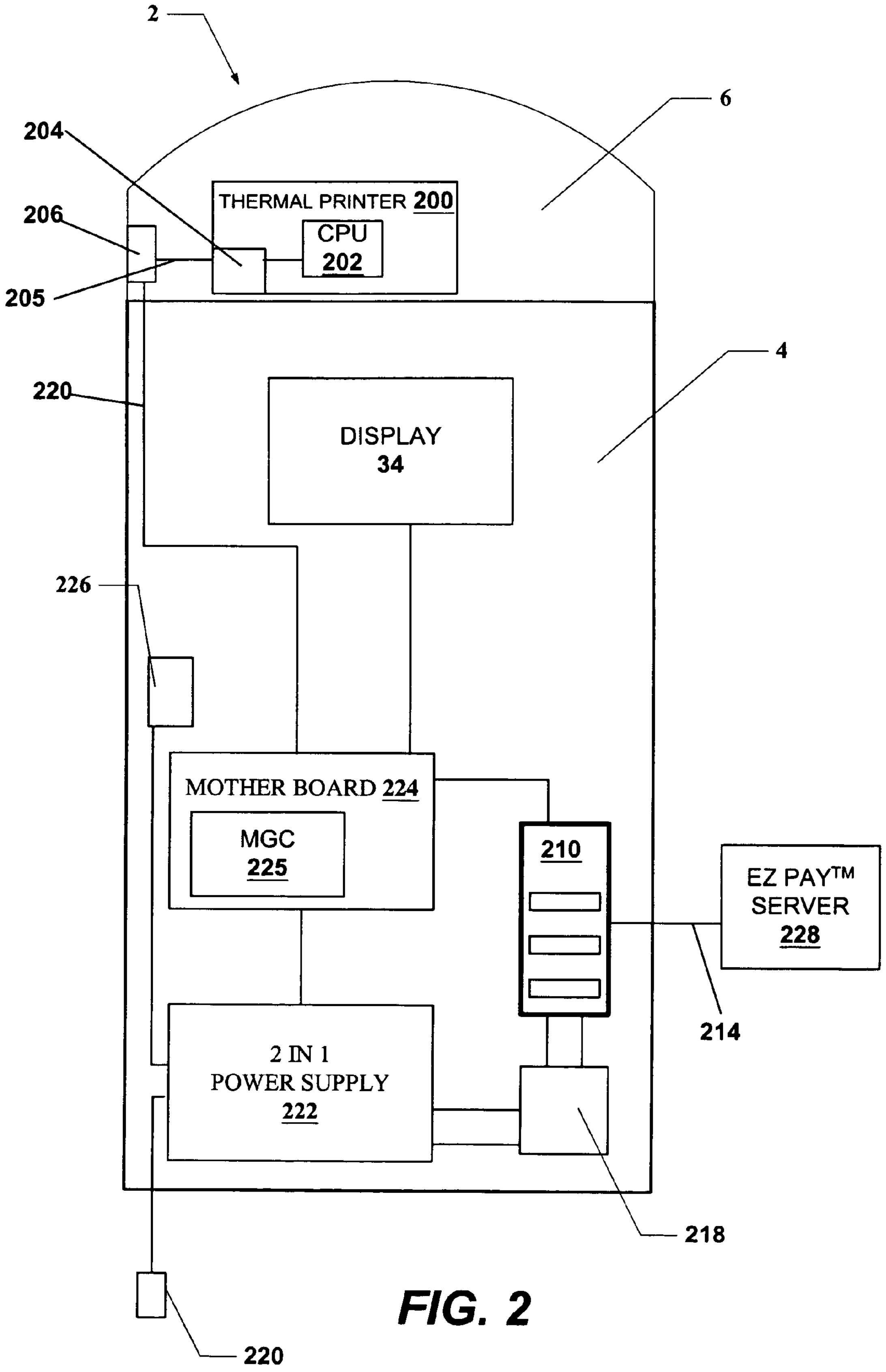
FIG. 2 is a block diagram of a gaming machine with a thermal printer of the present invention.

FIG. 2 is a block diagram of the functional blocks that may be employed in the gaming machine 2 described above. The gaming machine includes a dispenser 200 of a design or configuration for generating cashless instruments in accordance with this invention. In one embodiment, dispenser 200 is as a ticket printer as described elsewhere herein.

The gaming machine 2 includes a top box 6 and a main cabinet 4 as described above. The gaming machine 2 may receive power from a source outside the gaming machine 2 such as an AC Power source 220. The AC power source 220 may be connected to a 2 in 1 power supply 222.

The 2 in 1 power supply supplies two power sources. An interruptible power source, which may be interrupted by a power switch 226 and a continuous power source that may not be interrupted by the power switch 226. The continuous power source may be used to power gaming devices such as a fiber optic card on a main communication board 210. The interruptible power source may be used to supply power to the dispenser 200 and other gaming devices residing within the gaming machine. When providing maintenance to the dispenser 200, it is usually necessary to interrupt the power using the power switch 226. Power to various gaming devices on the gaming machine may be routed through a power distribution board 218.

A mother board 224 includes components such as a master gaming controller 225 that allow a game to be presented on the gaming machine 2. The game presentation may be presented on a display 34. In addition, the master gaming controller 225 may communicate with dispenser 200 via the cable harness 220. The cable harness may also carry an interruptible power source to the dispenser 200.

Various pieces of information pertaining to the bonus game may be displayed on screen 34 of gaming machine 2. For example, the screen may describe of bonus options available with the primary game, it may display graphics and text intended to attract users to play, etc. This information may be displayed at various locations on screen 34. In one embodiment, a side region of the main display is dedicated to displaying bonus information. Such region may show the bonus information continuously or temporarily—e.g., intermittently.

In another embodiment, the bonus information may be displayed on a "secondary" display screen provided on the gaming machine (not shown in FIG. 2). That screen may be dedicated to the display of bonus information or it may display both bonus game information and primary game information. One example of a gaming machine having a suitable secondary display screen for use with some embodiments of this invention is disclosed in U.S. Pat. No. 6,135,884 issued on Oct. 24, 2000 to Griswold et al., and is incorporated herein by reference in its entirety.

Frequently, the dispenser 200 will be a printer such as a thermal printer. To enable printing, the master gaming controller 225 may send printing instructions to dispenser 200 and receive printing information from dispenser 200. The printing instructions may contain parameters to be printed on a blank cashless instrument. These parameters may be printed according to a printing template accessible to a CPU 202 on the dispenser 200. An example of a printed cashless ticket is described with reference to FIG. 5A. Besides parameter values, the printing instructions may also contain print commands such as "begin printing", "advance paper", etc.

As indicated elsewhere herein, a "virtual" ticket can be issued to a portable device (smart card, cellular telephone, etc.) if dispenser 200 is a data transfer mechanism such as a wireless transceiver. In most cases, the virtual ticket is fundamentally a computer file.

In accordance with this invention, dispenser 200 is used to generate cashless instruments such as ticket vouchers for bonus awards. These awards comprise prizes, promotions, hotel services, lottery games and other applications. Printing templates for these other applications may also be stored on the dispenser 200. In addition, dispenser may be employed to generate conventional cashless game instruments such as those issued by a cashless system such as the EZ Pay™ ticket voucher system, manufactured by IGT (Reno, Nev.).

In response to the printing instructions from the master gaming controller 225, the dispenser 200 may send its own printing information back to the master gaming controller 225. For instance, dispenser 200 may send information from sensors monitored by the CPU 202. The information may include printer status information such as "low on tickets", "paper jam" and "duplicate ticket storage bin full" or printing status information such as "initiating printing" and "printing complete."

The communication between dispenser 200 and the master gaming controller may be implemented using different communication standards and connection schemes. For instance, using a serial Netplex communication protocol, which is an IGT proprietary communication standard, parameter values may be sent to the dispenser 200 in 255 byte data packets. The Netplex communication protocol allows data to be sent at 19.2K baud rate. As other examples, a Universal Serial Bus (USB) communication protocol or an RS-232 communication protocol may be used for communication between dispenser 200 and the master gaming controller 225. USB and RS-232 each allow different data transmission rates.

The cabling and connection schemes allow data to be transmitted between dispenser 200 and the master gaming controller 225. When a Netplex communication protocol is used, a 10 pin connector 204 may be connected to an 8 pin connector 206 via a 7 line Netplex cable 205. When a USB communication protocol is used, standard USB connectors and cabling may be employed. When an RS-232 communication protocol is used, an RS-232 cabling and connection scheme may be utilized. Note that the gaming machine 2 may communicate, via a network interface 214 to an EZ Pay™ server 228 or other server.

Figure 3:
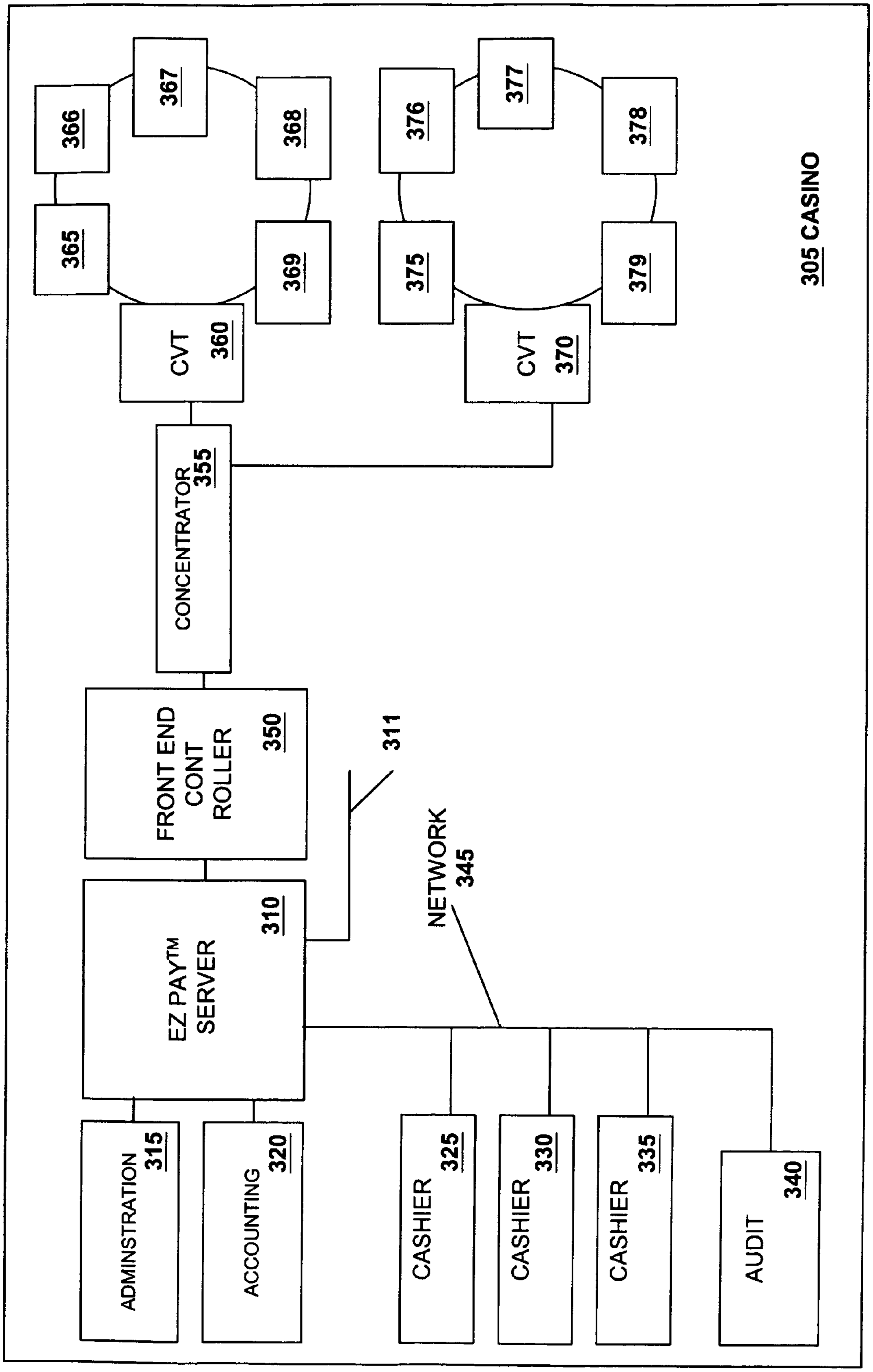
FIG. 3 is a block diagram of the components of a cashless system using the EZ Pay™ ticket voucher system including gaming machines with a thermal printer of the present invention.

FIG. 3 is a block diagram of the components of a cashless system using the EZ Pay™ ticket voucher system in accordance with a specific embodiment of the present invention. A cashless system includes the hardware and software components needed to generate and validate cashless instruments. Components of a cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ Pay™ ticket voucher system. Typically, a cashless system is installed at each property utilizing cashless instruments. To allow multi-site validations of cashless instruments, the cashless systems at each property may be linked to a cashless instrument transaction clearinghouse.

Returning to FIG. 3, a first group of gaming machines, 365, 366, 367, 368, and 369 is shown connected to a first clerk validation terminal (CVT) 360 and a second group of gaming machines, 375, 376, 377, 378 and 379 is shown connected to a second CVT 370. All of the gaming machines print cashless bonus award instruments, which may be exchanged for cash or accepted as indicia of credit in other gaming machines located within the property 305. As described above, a printer mounted in each gaming machine may be used to print a bonus cashless instrument. In this example, the ticket voucher serves as a cashless instrument. In addition, the gaming machines may accept ticket vouchers issued at a different property from property 305 where the different property utilizes the same or a different cashless system as compared to property 305.

The CVTs 360 and 370 store cashless instrument transaction information corresponding to the outstanding cashless instrument, including ticket vouchers, smart cards and debit cards, that are waiting for redemption. In this embodiment, the CVTs are separate from the gaming machine. However, the cashless instrument information may also be stored within each gaming machine or one gaming machine may functionally act as a CVT for a group of gaming machines eliminating the separate CVT hardware. In addition, cashless instrument transaction information may be stored in a cashless server including the EZ Pay™ server 310. The cashless instrument transaction information may be used when the ticket vouchers are validated and cashed out or redeemed in some other manner. The CVTs 360 and 370 may store the information for the ticket vouchers printed by the gaming machines connected to the CVT. For example, CVT 360 stores ticket voucher information for ticket vouchers printed by gaming machines 365, 366, 367, 368, and 369. When a ticket is printed out, ticket information is sent to the CVT using a communication protocol of some type from the gaming machine. For example, the gaming machine may send transaction information to the CVT, which is part of the cashless system using the slot acquisition system manufacture by IGT (Reno, Nev.).

In this embodiment, when a player wishes to cash out a bonus award indicated on a ticket, the player may redeem at the CVT associated with the gaming machine or any other CVT which is part of the cashless system associated with the CVT. For example, since CVT 360 and CVT 370 are connected as part of a single cashless system to the EZ Pay™ server 310, a player may redeem vouchers or utilize vouchers at the gaming machines, the CVT's (360 or 370), the cashier stations (325, 330, 335, and 340). The CVTs, cashiers, wireless cashiers and gaming machines may be referred to collectively as "cashless validation sites." To cash out the bonus award (or primary game award), the ticket voucher is validated by comparing information obtained from the ticket with information stored within the CVT. The information may be stored on the ticket as a bar code, radio-frequency identifier tag, etc. After an award has been redeemed, the CVT marks the ticket paid in a database to prevent a ticket voucher with similar information from being redeemed multiple times.

In this embodiment using the EZ Pay™ system, multiple groups of gaming machines connected to CVTs are connected together in a cross validation network 345. The cross validation network is typically comprised of one or more concentrators 355 which accept inputs from two or more CVTs and enables communications to and from the two or more CVTs using one communication line. The concentrator is connected to a front end controller 350 which may poll the CVTs for ticket voucher information. The front end controller is connected to an EZ Pay™ server 310 which may provide a variety of information services for the award ticket system including accounting 320 and administration 315.

The cross validation network allows ticket vouchers generated by any gaming machine connected to the cross validation network 345 to be accepted by any other gaming machine in the cross validation network 345. Additionally, the cross validation network allows a cashier at a cashier station 325, 330, and 335 to validate any ticket voucher generated from a gaming machine within the cross validation network 345. To cash out a ticket voucher, a player may present a ticket voucher at one of the cashier stations 325, 330, and 335 or to a game service representative carrying a wireless gaming device for validating ticket vouchers. Information obtained from the ticket voucher is used to validate the ticket by comparing information on the ticket with information stored on one of the CVTs connected to the cross validation network. In addition, when the ticket voucher was issued at another property, the information on the ticket may be stored at the other property. Thus, to validate the ticket voucher, the EZ Pay™ server may have to communicate with a cashless instrument transaction clearinghouse via the remote connection 311 to obtain the information necessary to validate the ticket voucher.

As tickets are validated, this information may be sent to audit services computer 340 providing audit services, the accounting computer 320 providing accounting services or the administration computer 315 providing administration services. In another embodiment, all of these services may be provided by the cashless server including the EZ Pay™ server 310. Examples of auditing services, which may be provided by cashless system software residing on the auditing computer 340 include 1) session reconciliation reports, 2) soft count reports, 3) soft count verification reports, 4) soft count exception reports, 5) machine ticket status reports and 6) security access report. Examples of accounting services, which may be provided by cashless system software residing on the accounting computer 320 include 1) ticket issuance reports, 2) ticket liability reports, expired ticket reports, 3) expired ticket paid reports and 4) ticket redemption reports. Examples of administration services, which may be provided by cashless system software residing on the administration computer 315 include 1) manual ticket receipt, 2) manual ticket report, 3) ticket validation report, 4) interim validation report, 5) validation window closer report, 6) voided ticket receipt and 7) voided ticket report. The duplicate ticket vouchers generated by the thermal printers in each gaming machine or duplicate receipts generated at the CVT's (360 and 370), cashier stations and wireless validation devices may be used to verify aspects of the auditing service reports, the accounting services reports and the administration services reports.

The Cashless Indicia of Bonus Awards

For the sake of convenience, the cashless instrument or indicator will sometimes be referred to as a "ticket," a data file, or the like. Bear in mind however that most embodiments of the invention are not limited to tickets or any other form of indicia—as opposed to some other indicator of a bonus award. For most embodiments and applications, any form of cashless indicia will do.

As noted above, the cashless indicia of the bonus award may take many different forms. One general class includes redeemable (often disposable) instruments such as tokens, printed tickets, coupons, and the like that are dispensed by machines. Another class includes information written to a portable instrument identifying a particular player (e.g., a smart card, player tracking card, personal digital assistant, cellular telephone, or other instrument controlled by the player at least temporarily). Here the cashless indicator is the card itself or at least the information written to the card.

Rather than being immediately redeemable and disposable, the instrument is reusable. Often, the player carries the instrument with him/her in a wallet or other personal accessory. In this approach, the player presents his/her instrument to the gaming machine or associated device to have the bonus award information written. The player presents the instrument elsewhere to retrieve the bonus award. During this process, the instrument is updated to reflect that the player has received the bonus award. In yet another class, the cashless instrument comprises information written to a database or other repository of data pertaining to players. As long as the player can prove, by authentication or otherwise, she is who she represents herself to be, then she will be able to collect the bonus award indicated in the data repository. Of course, at the time the bonus award first accrues, the cashless indicator must be written in the data repository together with the player's identification. So during play at the gaming machine, the player should identify herself by a player tracking card, biometric information, PIN, etc. The same or different authentication information may be employed to retrieve the bonus award.

Figure 4:
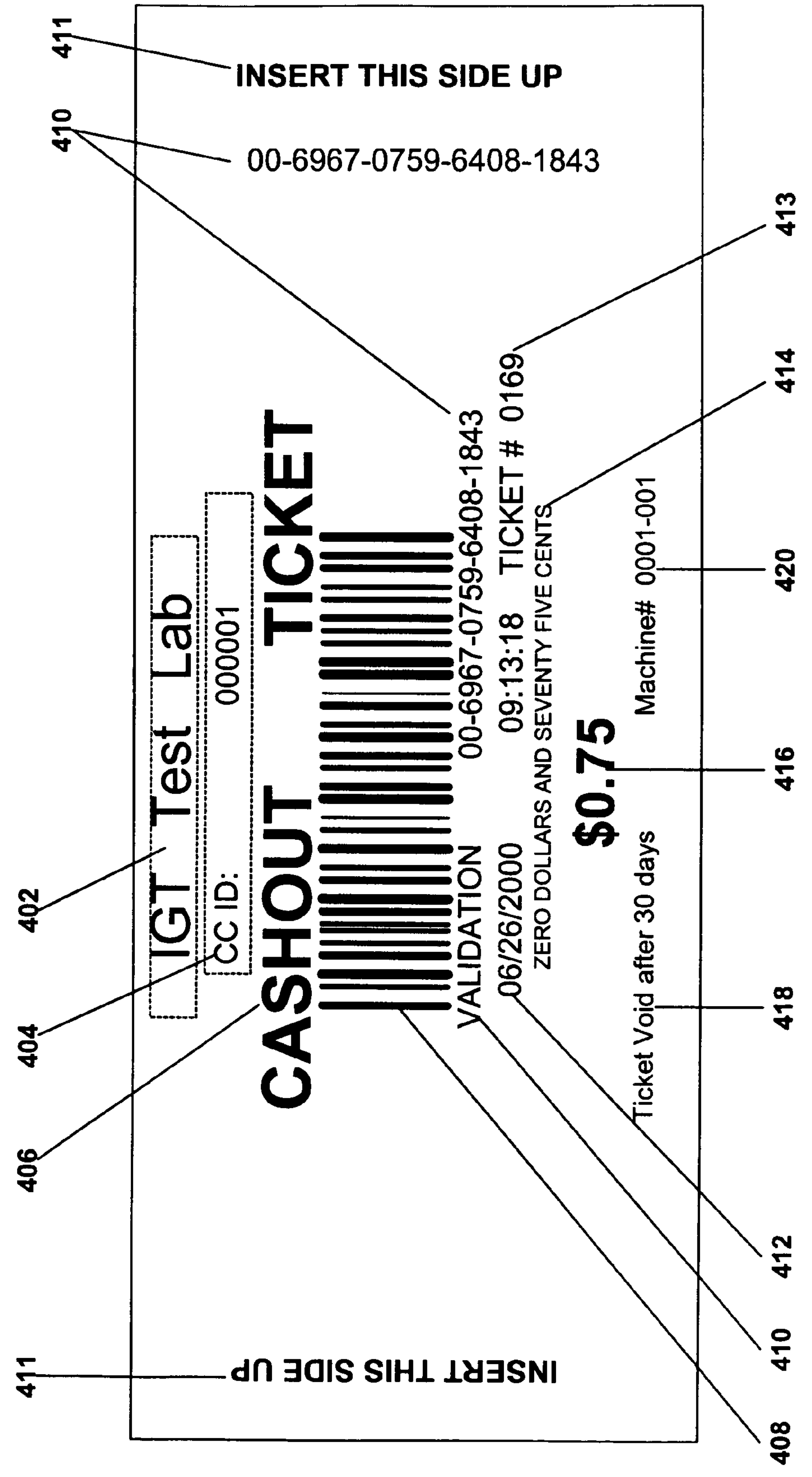
FIG. 4 is a block diagram of some components that may be provided on a printed ticket voucher.

When the cashless indicator of the bonus award is a ticket or other redeemable disposable instrument, it may take many different forms. One simple form is a paper or plastic ticket having various types of information printed thereon. FIG. 4 presents a specific example showing some components of a printed ticket 400. In one embodiment, the format of the ticket 400 may be generated from a template stored within a printer (e.g., a thermal printer as described above). The printing templates allow parameter values sent from the master gaming controller or other source of game logic on a gaming machine or from another gaming device such as a server to be printed in the format of a ticket voucher 400, a receipt or some other format.

Examples of parameter values that may be printed on a ticket include: 1) an establishment 402, a location 404 (e.g. city, state and zip code), 3) a ticket type 406 (e.g. cashout, receipt, duplicate, duplicate receipt, etc.), 4) a bar code 408, 5) a ticket validation number 410, 6) an issue date and issue time 412, 7) a ticket number 413, 8) a textual ticket value 414, 9) a numerical ticket value 416, 10) an expiration date 418 and 11) a machine number 420. In addition, preprinted graphics or text, including "INSERT THIS SIDE UP" 411, may be printed on each ticket. Note that validation identifiers other than validation number 410 and/or bar code 408 may be employed. As explained below, some tickets may employ an RFID or other transponder device.

Information such as the ticket value, the ticket issue date, the ticket issue time, the ticket number and the machine ID may be common to cashless systems that generate and validate tickets issued at a single property. In addition, information such as the ticket issue location may be needed to allow multi-site generation and validation of cashless instruments. Further, other types of information, besides the information listed above, may be stored on the cashless instrument.

In some embodiments, the ticket may serve a dual role. It presents both a bonus award and a primary award for a winning outcome on the primary game. In some such embodiments, only selected tickets may present both awards. Other tickets would merely present the primary award (or the bonus award without a primary award).

The tickets showing the bonus award may be generated in response to a specific bonus event identified in the game logic and/or a random event, not directly connected with a displayed bonus game. In the later case, one embodiment involves providing random (or selected) tickets in a fold of blank printable tickets with preprinted indicia of the bonus award. Then, when a ticket is printed with indicia of a primary award (from a winning event on the primary game), it may or may not also contain indicia of the bonus award depending on whether the current ticket was one of those that were preprinted. In certain embodiments, the bonus award indicia is preprinted on the backside of a ticket, while the primary award indicia is printed on the front-side at the time of issuance.

Alternatively, the bonus award indicia is not preprinted on any tickets, but rather printed fresh at the time when the tickets are issued.

In some embodiments, the cashless indicator of the bonus award is issued concurrently with indicator of the primary award, like the embodiments just described, but unlike these earlier embodiments, the bonus award is indicated on a separate ticket. That separate ticket may be issued from the same dispenser that issues the primary award ticket or from a separate dispenser. In one convenient embodiment, a ticket printer has a dual heads so that it can concurrently print the bonus award ticket and the primary award ticket. These may be printed on different ones of a duplicate ticket pair provided from a fold of blank tickets using a printer of the type described above, for example. A bonus ticket from a duplicate ticket pair may use a similar or different template as used for printing the primary ticket. Either or both of the bonus ticket and the primary ticket may have some preprinted information.

As an alternative to the duplicate ticket embodiment, the blank ticket may be a unitary instrument having at least two portions that are separable from another. At least one portion represents the bonus award. Another portion or portions may represent the primary game award. The portions may be separable by a perforation, adhesion, electrostatic attraction, breakable seal, etc.

In a particularly preferred embodiment, the cashless instrument includes two portions adhesively connected and separable from one another by peeling one away. The one portion that peels off can be used as the cashless indicator of the bonus award and the other portion can be the cashless indicator of the primary award. Alternatively, the other portion can contain advertising or other relevant information. Possibly, it can provide information pertaining to other products or services of the vendor or manufacturer of the bonus award.

Figure 5A:
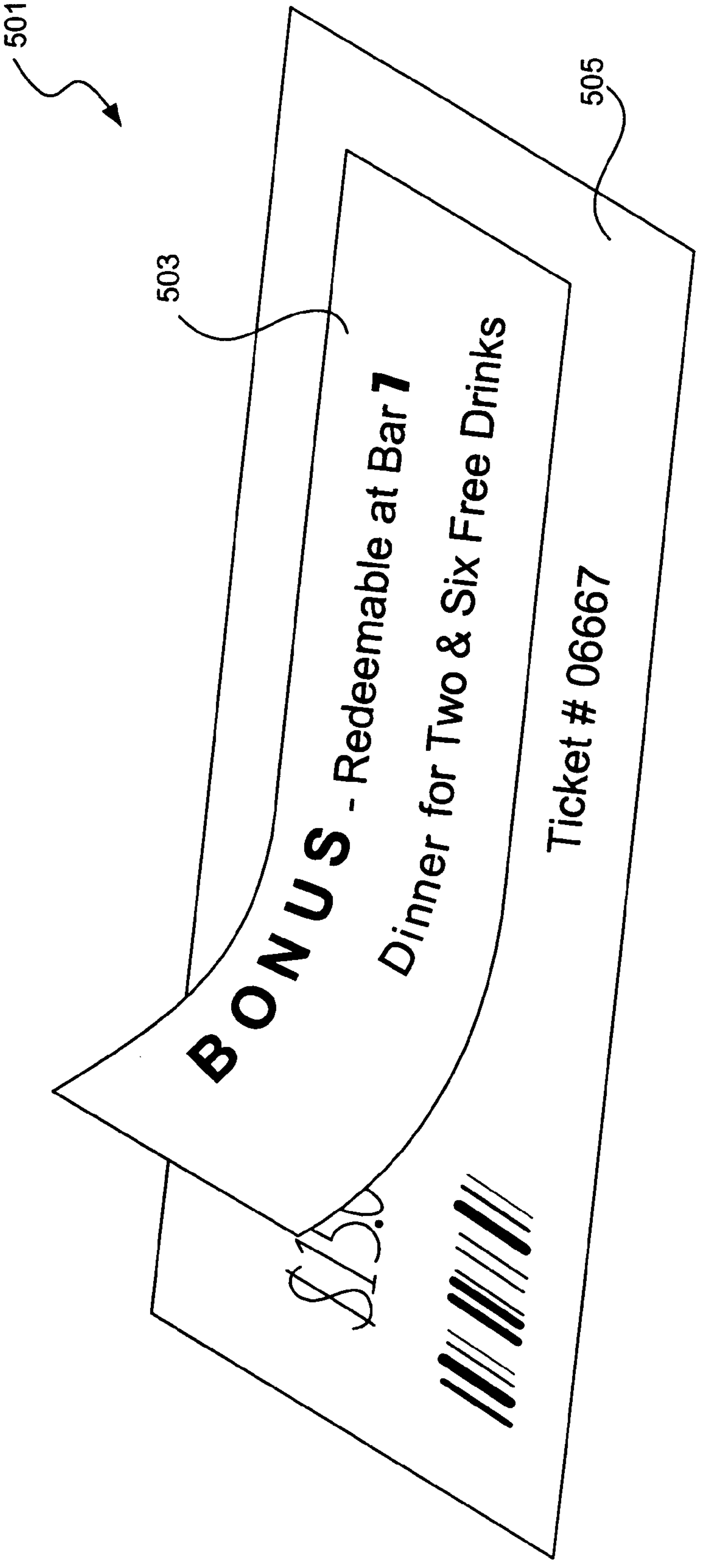
FIG. 5A shows a cashless instrument having two separable portions in accordance with an embodiment of this invention.

FIG. 5A depicts one embodiment of a two portion peelable ticket of this invention. As shown, a ticket 501 includes a first portion 503 which serves as the cashless indicator of the bonus award and a second portion 505 which serves another purpose such as advertising or indicating a primary game award.

In still other embodiments, the cashless indicator may provide one or more "secondary games." In addition to the bonus award represented in the cashless instrument, the instrument contains some other novelty that allows play of a secondary game. Alternatively, the secondary game could serve as the bonus award itself or a "hurdle" to the bonus award. Examples of secondary games include bingo games, scratch games, collect all of a category games, raffles, sweepstakes, lotteries, trivia games, etc. In each case, the cashless indicator itself serves as a medium for the secondary game. In some cases, e.g., certain raffles, the ticket includes the player identity. In some embodiments, the machine prints the player identification directly on the ticket—deriving such information from a player tracking system or the like. Alternatively, the player must fill in her name and contact information. In other embodiments, a serial number or other unique feature of a ticket provides the necessary identification.

In one specific example, the secondary game comprises a lottery in which the cashless indicator serves as lottery ticket.

The bonus game that issues such tickets may be tied into an existing lottery—even a government run lottery. Or it may be associated solely with the bonus game in question. Regardless of how the larger game is structured, the lottery component of the ticket is similar or identical to that provided with a state lottery, but it is issued as a bonus or prize. To implement the lottery, the backside of the ticket will include a scratch-off or peel-off lottery game. The tickets containing the lottery mechanism are issued randomly from the supply of machine tickets in one embodiment. They are issued as part of a planned event in another embodiment. In this second embodiment, the lottery component may be printed on the card in response to a specific event in the primary game (or otherwise).

Various mechanisms can be used to provide for authentication, anti-counterfeiting, and/or tracking. Bar codes, watermarks, and/or printed identifiers (numbers, signatures, pictures, fingerprints) provide one mechanism. In this regard, related information is provided in U.S. application Ser. No. 10/085,154, titled "PLAYER AUTHENTICATION METHOD FOR GAMING MACHINE VOUCHERS", naming Nguyen and Paulsen as inventor, and filed Feb. 27, 2002, which is incorporated herein by reference for all purposes. One sophisticated and secure technology employs a transponder that can reply to an external probe with a signal identifying it. Because such transponders are embedded in the cashless indicator, they also identify the indicator itself. Transponders can respond to various types of probes including electromagnetic radiation, magnetic fields, electrical fields, chemical signals, and the like depending upon design.

One specific mechanism is a passive radio-frequency identification tag (RFID) embedded in the cashless indicator. A typical passive radio-frequency identification tag includes an antenna (e.g., a coil of wire) and logic (e.g., a simple microchip) for responding to an RF interrogation or "probe" signal with a reply signal containing a unique identifier associated with the tag. When in proximity of an interrogation signal, the rfid uses a small amount of the electromagnetic energy it receives to power the logic and broadcast its identifier. Thus, the passive rfid requires no battery or other active power source. At time of this filing, relatively small rfids (e.g., less than one millimeter across and 0.5 millimeters thick) suitable for use with cashless instruments of this invention are available from Texas Instruments Corporation in the US, Hitachi in Japan, and Infineon Technologies in Germany. Smaller more robust versions are expected in the near future.

Figure 5B:
FIG. 5B shows a cashless instrument printed from a client computer that can participate in gaming remotely, over a network.

In certain Internet gaming (more generally network gaming) embodiments, the player is able to print her own gaming receipt (cashless indicator of a bonus award) on her home printer for redemption at a physical (brick and mortar) casino. FIG. 5B depicts a sample gaming receipt for Internet gaming. In this example, the player Mike Smith is registered with the Red Star Casino in Las Vegas, Nev. After he returns home from visiting the Red Star Casino, he continues to play. He may do so with points/bonuses/cash accrued at the Red Star. He does this by playing on the Red Star Internet site.

At the conclusion of the Internet play, he prints out a receipt (likely on 8½×11 paper) on his home computer printer to take with him to Las Vegas to redeem. The receipt can be redeemed at a game machine, casino kiosk, or other area, or online In this example, the receipt information includes the following: cash amount 511 (this could also be points or credits), player name 513, player number 515 assigned when he enrolled with the casino, and a unique gaming receipt number 517. In this example, these items have associated bar codes 519, 519', and 519" that can be scanned by the casino or by the game machine when the ticket is redeemed.

Upon redemption at the casino, the player's identity must be verified. In one approach, the player signs the receipt or prints a pre-digitized version of his signature 521 on the cashless instrument. The signature is then compared to a stored signature in a system database. In this embodiment, the player's signature is stored when the he signs up for an Internet gaming program. In an alternative approach, the player's identity is verified using a picture 523 of the player that is stored in the casino's system. When the player attempts to redeem his Internet gaming receipt, the picture is verified by casino personnel. Alternatively, an algorithmic facial recognition system is employed to verify that the player is who he says he is. In yet another approach, the player gives his fingerprint when redeeming his Internet gaming receipt. That fingerprint is compared against one stored in the casino's system. The stored fingerprint may also be printed as printed code 525 (shown as a fingerprint in this example) on the receipt. Note that while FIG. 5B shows a digitized signature 521, a picture 523, and a code 525, the receipt typically contains only one of these. Of course, banner ads and promotions 527 may be printed on the bonus award receipts. This allows the casino and its partners advertising and promotional space on the ticket.

Figure 6:
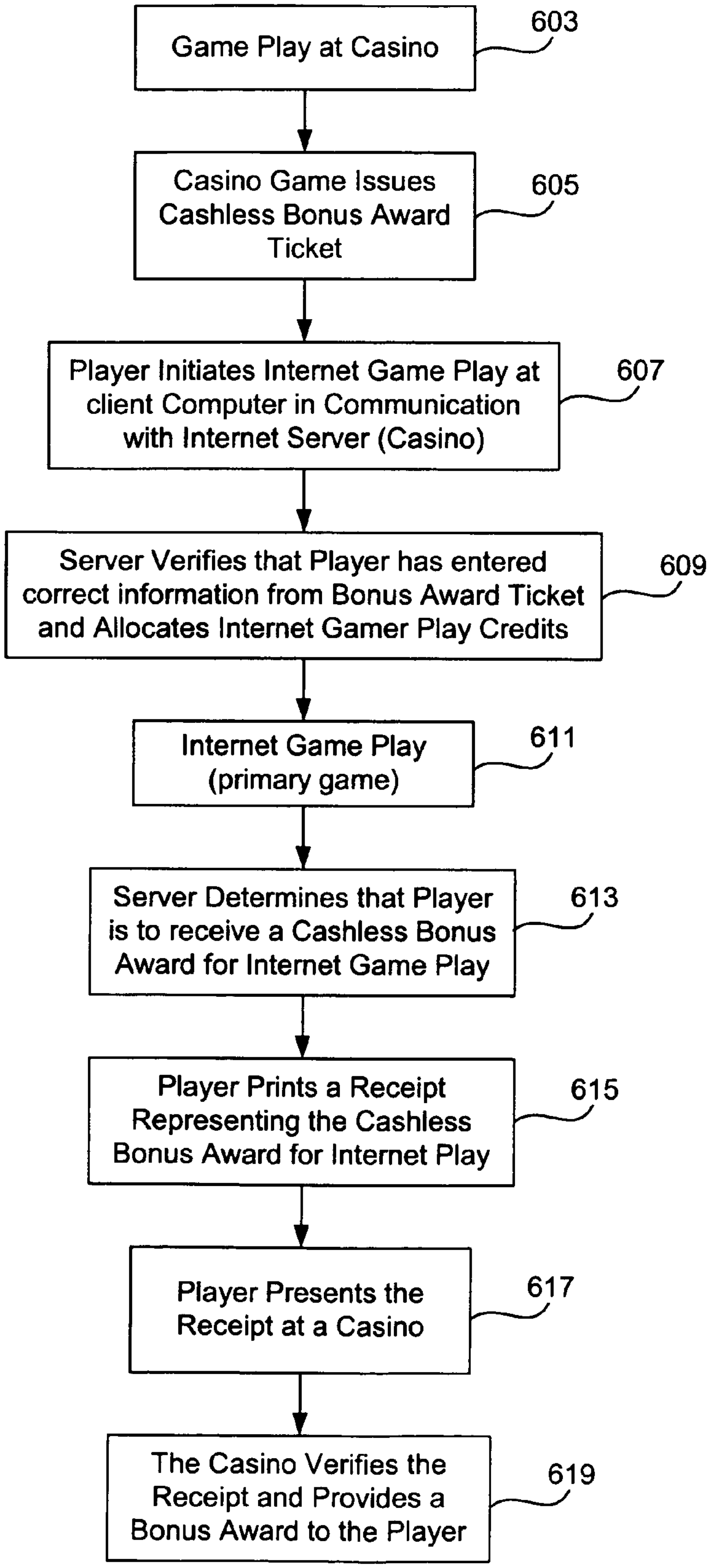
FIG. 6 is a process flow diagram depicting the sequence of operations in a typical Internet Gaming application of the present invention.

FIG. 6 presents one likely scenario for using the cashless bonus awards of this invention for Internet gaming. The process begins at 603 with a player playing a particular game on a gaming machine in a casino. For example, the player may be playing a slot game on a slot machine or a video poker game on a video gaming machine. As explained above, such game represents a "primary game" in the context of this invention. At some point during the game play, or after the game play concludes, the casino game issues a cashless bonus award ticket to the player. See block 605.

In the depicted scenario, the player then leaves the casino and goes to another location outside the casino. For Internet gaming, that other location may well be the player's home. Regardless, while at this remote location, the player initiates an Internet game play through a client computer (possibly the player's home PC). See block 607. The client computer is in communication with a game server at the casino. The communication is mediated by the Internet. As part of the Internet game play, the player uses the cashless bonus award received while playing at the actual casino. In this embodiment, the Internet gaming protocol allows the player to make use of the bonus award from his or her client computer. To this end, the casino server must verify that the player has entered correct information from the bonus award ticket. See block 609. As indicated above, the server may verify by receiving a unique code identifying the bonus award ticket. Other means of verification are possible if the client computer has an associated card reader, barcode scanner, or other appropriate peripheral device. Regardless of how the casino verifies the bonus award, once verification is complete, the casino server allocates Internet game play credits to the Internet gaming player.

From this point, the player can participate in an Internet gaming session while drawing on the credits obtained from his or her cashless bonus award. See 611. Note that most, if all, of this Internet game play constitutes a primary game. In some embodiments, the use of a cashless bonus award extends no further. The player simply makes use of that cashless award to obtain credits for Internet game play. In other embodiments, however, the Internet gaming protocol itself can issue separate cashless bonus awards. This embodiment is depicted in the remainder of the process flow diagram of FIG. 6.

As indicated at block 613, the server determines that the player is to receive a cashless bonus award for his or her Internet game playing. To provide a cashless indicator of this bonus award, the player prints a receipt representing the award. See 615. As discussed above in the context of FIG. 5B, this receipt may include various fields useful for redeeming the bonus award. Note that the client computer can also print a cashless indicator of an award for play on the primary Internet game. And the cashless indicator may include indicia for both a primary award and a bonus award in a single printed receipt.

At block 617, the player presents the receipt at a casino associated with the Internet gaming server. The casino then verifies the receipt and provides a bonus award to the player as indicated at block 619. This award can take any of a number of forms as described in the next section.

Types of Awards

The intrinsic value in the cashless instrument resides in its ability to be converted to a bonus award—typically cash, prizes, and/or additional game plays. The player redeems the cashless instrument at a gaming machine or other location, typically in a casino. In the case of Internet-enabled gaming, the player may redeem the ticket at a client computer, where he or she enters information from the cashless instrument to allow game plays from the client computer.

An organization controls the generation and redemption of the cashless instruments. In one example, prize redemption is run by a casino or by a casino in partnership with another business. For example, casino X could partner with Cool Shoes athletic shoe manufacture to offer court shoes as one type of redemption prize. A cross-promotional bonus award may be issued depending upon the facilities available near the casino. For example, food or merchandise from vendors affiliated with the casino may be awarded.

Many different bonus awards are possible including generally services, merchandise, cash, comps, etc. More specific examples of prizes include vacations, airline miles, shopping sprees, automobiles, computers, airplane trips, camping trips, adventures, cruises, sporting equipment, jewelry, spas, etc. The awards can belong to different "tiers," with some awards being more valuable than others. For example, the awards may be diamonds, with higher tier awards being larger diamonds. The higher tier awards are obtained by redeeming multiple cashless instruments. In other embodiments, the individual cashless instruments have different intrinsic values (e.g., gold, silver and bronze). The higher value tickets are redeemed for higher tier prizes.

In addition, the cashless instrument may represent a credit for additional plays on the issuing machine or on some other machine. In one embodiment, the cashless instrument may be converted to game plays on any other machine in a property (e.g., casino, store, or mall) or a subset of machines in the property. In another embodiment, the cashless instrument allows play on any machine under control of a particular enterprise or group of allied enterprises. Thus, the cashless instrument can be redeemed as plays on numerous machines across multiple properties. In another embodiment, the cashless instrument allows gaming over the Internet or other large network. For example, a casino machine may issue a bonus award ticket having a serial number and redeemable dollar amount. The player takes that ticket home with her and continues playing at the casino's Internet gaming site. To do this she logs on to the casino's site, enters her user ID, password, and the ticket serial number, and then continues to play.

Note that when the cashless instrument is presented to another machine for play it need not initiate a "normal" general-purpose play. In some embodiments, the instrument may trigger more rapid progression into a bonus mode or more rapid accrual of bonus awards. Also, the instrument may trigger award of different types of complementary bonus awards. Many variations on this theme are possible. In one embodiment, if the cashless instrument was obtained at a Harley-Davidson™ game, then the bonus awards provided at another machine (upon insertion of the cashless instrument) are leather jackets or other motorcycle merchandise, for example.

Bonus Games

As used herein, the term "bonus game" and variations thereof refer generally to a game or a component of a game involving procedures in addition to the primary game on the gaming machine. For example, if the primary game is a reel slot game, the bonus game may allow players the possibility of winning more than the pay table indicates. Typically, but not necessarily, the bonus game outcome will depend upon the outcome of the primary game. For example, a bonus game outcome may be contingent upon a "cherry" symbol being displayed on a slot reel at the end of a slot game play. Also, the bonus game outcome may depend upon winning a payout from a slot game play while the gaming machine is in a "bonus zone." In alternative embodiments, the bonus game may be unconnected with the outcome of a primary game play.

A few very specific bonus games will now be described. Please understand that these are merely a very few of the many different bonus games that can be envisioned for use with this invention.

A first game of interest is referred to as a "times pay bonus" game. In this game, a player may enter a "window of bonus activity" after a predetermined number of coins have been played (e.g., 100-200 consecutive coins or credits). While in the window, a player may randomly encounter plays in which the payout is multiplied beyond the amount on the pay table or otherwise enhanced. In one embodiment, a system operator can specify both the size of the window (i.e., the number of consecutive plays in which a player remains in the window) and the number of coins needed to reach the window.

While in the window, the system will randomly assign special significance to a certain number of consecutive game plays referred to as a "bonus zone." If while the player is in a zone, he or she obtains a winning combination, then the pay-out associated with that combination is multiplied by a set factor (e.g., 2 to 9) or otherwise enhanced. The enhanced ("bonus") component is paid out via a cashless instrument as described above.

In one specific embodiment, the operator of the machine can specify such parameters as the size of the zone and the multiplier for any times paid bonus winning combination. As mentioned, the operator may also be able to set the number of coins/credits required to reach a window and the size of the window. Upon the selection of a new setting, the system will automatically adjust the overall payout percentage including bonus contribution.

In an alternative embodiment, the number of times play games awarded (e.g., the size of the zone) and the times play multiplier amount may be adjustable depending upon such factors as the time of day, a level of player status, a type of player tracking card inserted, or other specified events. When such adjustments occur, the display can make this clear to the player.

A variation on the "times play bonus" game is a "mystery jackpot bonus" game. A "window" is reached after a predetermined number of coin in events as described above for times play bonus game. Before reaching the window, the system may periodically display a bonus indicator on the display requesting that the player "WATCH FOR THE MYSTERY JACKPOT BONUS." This display may be accompanied by some unique sound such as a "ding" sound. While in the window, another more frequently displayed attract screen accompanied by two dings tells the player that the bonus is "COMING SOON."

When the mystery jackpot randomly hits within the window, a graphic appears on the screen to indicate that a game play results in the mystery jackpot. The graphic may be, for example, a mystery jackpot logo with multiple question marks pulsating in the background. Upon receipt of a winning play, the system converts the question marks to the amount won and a congratulations statement. An accompanying sound may play when the mystery jackpot is hit.

The game operator may set such parameters as the number of coins needed to reach the window, the size of the window, number of coins in a play session, number of coins out in a play session, and the jackpot range. These parameters may also be adjusted via a system automatically depending upon the time of day, a player's tracking card priority, etc. When any parameter is reset, the system automatically recalculates the game percentages.

The next bonus game of interest is a "temperature's rising bonus" game. This game is centered about an image of a thermometer presented in the display. Initially, the thermometer indicates a relatively low temperature. With each payout from a machine, the temperature in the thermometer rises by a notch. Eventually, when the temperature reaches a maximum value, the next win is accompanied by a bonus evidenced by issuance of an appropriate cashless instrument. After payout, the system will normally reset to the lowest possible temperature.

Examples of other types of suitable bonus game include the following. In a lottery/sweepstake game, the player receives an entry every time a bonus trigger condition is activated. In a free plays bonus game, the player receives one or more free games whenever the bonus event occurs. In another example, the player receives one of X different symbols upon triggering of a bonus condition. The player collects all X symbols to win the bonus award. And, of course, there is the instant award in which the player instantly wins a non-cash bonus award upon occurrence of the bonus event.

Other Embodiments

Although the foregoing invention has been described in some detail for purposes of clarity of understanding, it will be apparent that certain changes and modifications may be practiced within the scope of the appended claims. For instance, while the invention has been depicted as being part of an EZPay™ system in preferred embodiments, the invention is not so limited. It may be employed in any cashless system, now available or developed in the future.

What is claimed is:

1. A method of issuing a cashless instrument for redeeming at least a bonus award that supplements a primary award of a primary game effectively provided by a gaming machine, the method comprising:

receiving cash and/or an indicia of credit for a wager on the primary game;

converting the cash and/or the indicia of credit to primary credits used for the wager on the primary game effectively provided by the gaming machine;

executing part of a play of the primary game on the gaming machine after receiving the cash and/or indicia of credit;

detecting a bonus event as the result of the execution of the part of the play of the primary game;

determining whether or not said bonus event has triggered a bonus award for play during the primary game;

if it is determined that said bonus event has triggered a bonus award for play during the primary game, then storing bonus data indicative of said bonus award to a bonus data repository maintained separately from the primary credits used for the wager on the primary game; and issuing the cashless instrument based on the bonus data stored on the bonus data repository after the determination that said bonus event has triggered said bonus award for play during the primary game effectively provided by the gaming machine as the result of the execution of the part of the play on the gaming machine, wherein the cashless instrument includes a separable primary award portion and a separable bonus award portion that are separable from each other, wherein the separable primary award portion is redeemable for a primary award won for play of the primary game, and the separable bonus award portion is redeemable for said bonus award, thereby allowing said bonus award to be separately redeemed from the primary award by separating the separable bonus award portion from the separable primary award portion and submitting said bonus award portion in order to receive said bonus award after said bonus award is verified based on the bonus data stored in the bonus data repository and wherein the cashless instrument further comprises indicia for playing a secondary bonus game beyond the primary game comprising collecting multiple different cashless instruments of a bonus award awarded for part of the play of the primary game.

2. The method of claim 1, wherein the cashless instrument is a ticket.

3. The method of claim 1, wherein the two portions are adhesively affixed to one another and can be separated by peeling one portion off of the other portion.

4. The method of claim 1 further comprising:

determining that a winning outcome has occurred in the play of the primary game; and issuing from the gaming machine a second cashless instrument of the primary award.

5. The method of claim 4, wherein issuing the cashless instrument of the bonus award comprises issuing an instrument having a representation of the bonus award and the representation of the primary award.

6. The method of claim 5, wherein the instrument is a ticket having the representation of the bonus award on one side and the representation of the primary award on the other side.

7. The method of claim 6, further comprising:

storing player data indicative of a particular player in connection with the bonus data and bonus award; and issuing, based on said player data, the cashless instrument to the particular player, thereby allowing the particular player to redeem the bonus award by effectively submitting the cashless instrument.

8. The method of claim 1, wherein the secondary bonus game comprises a scratch-off game printed on the cashless instrument of the bonus award.

9. The method of claim 1, wherein the cashless instrument of the bonus award comprises a portable instrument identifying a particular player.

10. The method of claim 9, wherein the portable instrument is a player tracking card, a smart card, or a cellular device.

11. The method of claim 1, wherein the issuing of the cashless instrument comprises writing information to a data repository and specifying the bonus award for a particular player.

12. The method of claim 1, wherein the cashless instrument of the bonus award comprises a transponder that responds with unique identifiers when probed with an interrogation signal.

13. The method of claim 1, wherein the cashless instrument comprises a lottery ticket portion.

14. The method of claim 1, wherein the triggered bonus event corresponds to some event in the primary game or the quantity of play on the primary game.

15. A gaming machine for issuing a cashless instrument of a bonus award that supplements a primary game award of a primary game effectively provided by a gaming machine, the gaming machine comprising:

a dispenser for issuing cashless indicia of game awards;

a master gaming controller designed or configured to execute;

primary game logic for receiving cash and/or an indicia of credit for a wager on the primary game; for converting the cash and/or the indicia of credit to the primary credits used for the wager on the primary game effectively provided by said gaming machine; for determining an outcome of the primary game and for presenting a presentation of the primary game; and bonus game logic for detecting a bonus event as the result of the execution of part of the play of the primary game; for determining whether or not said bonus event has triggered a bonus award for the primary game; for storing information regarding bonus data indicative of said bonus award to a bonus data repository maintained separately from the primary credits used for the wager on the primary game; and for instructing the dispenser to issue a cashless instrument based on the bonus data if it is determined that said bonus event has triggered said bonus award for the primary game effectively provided by the gaming machine, wherein the cashless instrument includes two portions that are separable from each other and at least one of the separable portions is redeemable for said bonus award, thereby allowing the bonus award to be subsequently redeemed by presenting the cashless instrument and the cashless instrument further comprises indicia for playing a secondary bonus game beyond the primary game comprising collecting multiple different cashless instruments of a bonus award awarded for part of the play of the primary game;

one or more input mechanism for receiving the cash or indicia of credit; and a display for displaying the primary game.

16. The gaming machine of claim 15, further comprising an interface for communicating with a server that provides information about the bonus game.

17. The gaming machine of claim 15, wherein the dispenser is a thermal printer.

18. The gaming machine of claim 17, wherein the printer is designed or configured to print indicia of the bonus award on a first side of a ticket opposite a second side that contains non-bonus information.

19. The gaming machine of claim 18, wherein the second side displays at least one of the primary game award and promotional information.

20. The gaming machine of claim 15, wherein the primary game logic comprises logic for playing one or more of a slot game, a video card game, a keno game, a pachinko game, and a checkers game.

21. The gaming machine of claim 15, wherein the bonus game logic is coupled to the primary game logic in a manner allowing the bonus game logic to detect events in the primary game that trigger issuance of the cashless instruments of bonus awards.

22. The gaming machine of claim 15, wherein the bonus game logic randomly issues the cashless instrument of bonus awards.

23. The gaming machine of claim 15, wherein the dispenser can issue tickets comprising transponders that respond with unique identifiers when probed with an interrogation signal.

24. The gaming machine of claim 15, further comprising a wireless transceiver for transferring data regarding the bonus awards.

25. A system for issuing a cashless instrument of a bonus award that supplements a primary award of a primary game, the system comprising:

one or more gaming machines, each gaming machine comprising:

a dispenser for issuing cashless instrument of game awards;

a master gaming controller designed or configured to execute;

primary game logic for receiving cash and/or an indicia of credit for a wager on the primary game; for converting the cash and/or the indicia of credit to the primary credits used for the wager on the primary game effectively provided by said gaming machine, for determining an outcome of the primary game and for presenting a presentation of the primary game; and bonus game logic for storing information regarding bonus data indicative of a bonus award to a bonus data repository maintained separately from the primary credits used for the wager on the primary game wherein said bonus game logic is coupled to said primary game logic in a manner allowing said bonus game logic to detect events in the primary game that trigger issuance of cashless instruments of bonus awards; and for instructing the dispenser to issue cashless instrument based on the bonus data if it is determined that a bonus event has triggered a bonus award for the primary game effectively provided by the gaming machine, wherein the cashless instrument includes two portions that are separable from each other and at least one of the separable portions is redeemable for said bonus award, thereby allowing said bonus award to be subsequently redeemed by presenting the cashless instrument and the cashless instrument further comprises indicia for playing a secondary bonus game beyond the primary game comprising collecting multiple different cashless instruments of a bonus award;

one or more input mechanism for receiving the cash or indicia of credit; and a display for displaying the primary game; and a server for communicating over a network with the gaming machine and serving data pertaining to the bonus game; and the network for allowing communication between the gaming machine and the server.

26. The system of claim 25, wherein the gaming machine further comprises an interface for communicating with the server that provides information about the bonus game.

27. The system of claim 25, further comprising a validation terminal.

28. The system of claim 25, wherein the primary game logic comprises logic for playing one or more of a slot game, a video card game, a keno game, a pachinko game, and a checkers game.

29. The system of claim 25, wherein the bonus game logic randomly issues the cashless instrument of bonus awards.

30. A method of issuing a cashless instrument of a bonus award that supplements a primary award of a primary game on a client computer communicating with a gaming server over a network, the method comprising:

executing part of a play of the primary game on the gaming server;

sending information regarding the primary game to the client computer;

detecting a bonus event;

determining whether or not said bonus event has triggered a bonus award for play during the primary game;

if it is determined that said bonus event has triggered a bonus award for play during the primary game, then storing bonus data indicative of said bonus award to a bonus data repository maintained separately from the primary credits used for the wager on the primary game; and instructing the client computer by the gaming server to issue a cashless instrument of the bonus award from the client computer after the determination that said bonus event has triggered a bonus award for the primary game effectively provided by the gaming machine, wherein the cashless instrument includes two portions that are separable from each other and at least one of the separable portions is redeemable for said bonus award, thereby allowing said bonus award to be subsequently redeemed by presenting the cashless instrument and the cashless instrument further comprises indicia for playing a secondary bonus game beyond the primary game comprising collecting multiple different cashless instruments of a bonus award awarded for part of the play of the primary game.

31. The method of claim 30, wherein the cashless instrument is a receipt printed from the client computer.

32. The method of claim 30, further comprising:

determining that a winning event has occurred in the primary game; and instructing the client computer to issue a cashless instrument of the primary award.

33. The method of claim 32, wherein issuing the cashless instrument of the bonus award comprises issuing an instrument having a representation of the bonus award and the representation of the primary award.

34. The method of claim 30, wherein the cashless instrument of the bonus award comprises verification information identifying an Internet gaming player who played the primary game.

* * * * *